(12) United States Patent
Trantham

(10) Patent No.: US 11,513,540 B2
(45) Date of Patent: Nov. 29, 2022

(54) PRESSURE COMPENSATED FLOW CONTROLLER WITH ONLY TWO PRESSURES

(71) Applicant: IMI Hydronic Engineering, Inc., Dallas, TX (US)

(72) Inventor: John M. Trantham, Hurst, TX (US)

(73) Assignee: IMI Hydronic Engineering, Inc., Dallas, TX (US)

( * ) Notice: Subject to any disclaimer, the term of this patent is extended or adjusted under 35 U.S.C. 154(b) by 0 days.

(21) Appl. No.: 16/038,820

(22) Filed: Jul. 18, 2018

(65) Prior Publication Data

US 2019/0079542 A1   Mar. 14, 2019

Related U.S. Application Data

(60) Provisional application No. 62/584,201, filed on Nov. 10, 2017, provisional application No. 62/534,453, filed on Jul. 19, 2017.

(51) Int. Cl.
| | | |
|---|---|---|
| *G05D 7/01* | (2006.01) | |
| *F16K 31/122* | (2006.01) | |
| *F16K 3/32* | (2006.01) | |
| *F16K 1/52* | (2006.01) | |

(52) U.S. Cl.
CPC ....... *G05D 7/0133* (2013.01); *F16K 31/1221* (2013.01); *F16K 1/52* (2013.01); *F16K 3/32* (2013.01)

(58) Field of Classification Search
CPC ........... Y10T 137/785; Y10T 137/7848; Y10T 137/7851; Y10T 137/7834; G05D 7/0133; F16K 1/36; F16K 1/54; F16K 1/52; F16K 1/06; F16K 31/1221; F16K 3/32; F16K 3/0209

See application file for complete search history.

(56) References Cited

U.S. PATENT DOCUMENTS

| | | | | |
|---|---|---|---|---|
| 1,400,011 | A | * 12/1921 | Baker | F04B 53/129 137/514.3 |
| 1,729,819 | A | * 10/1929 | Campbell | G05D 16/0404 137/505 |
| 2,014,314 | A | * 9/1935 | Defenbaugh | F16K 1/38 251/122 |
| 2,319,021 | A | * 5/1943 | Van Nest | F16K 17/0433 137/494 |
| 2,541,176 | A | * 2/1951 | Rockwell | F16K 31/1262 137/625.3 |
| 2,642,254 | A | * 6/1953 | Armstrong | F16K 11/202 137/637.2 |

(Continued)

FOREIGN PATENT DOCUMENTS

GB          1349363 A       4/1974

*Primary Examiner* — Jessica Cahill

(57) ABSTRACT

According to an embodiment of the disclosure, an apparatus for a flow of fluid includes a first and a second element that form an exponentially changing restriction between them for a flow of a fluid. At least one of the first and second elements is configured to move in response to changing pressures to change the restriction. One of the first and second elements includes a wall with one or more cutouts that have an admittance that changes exponentially with respect to the movement of the first or second element.

8 Claims, 4 Drawing Sheets

(56) References Cited

U.S. PATENT DOCUMENTS

| | | | | |
|---|---|---|---|---|
| 2,941,401 | A * | 6/1960 | Streeter | G01F 1/26 73/861.52 |
| 3,157,200 | A * | 11/1964 | Rowan | F16K 39/04 137/625.33 |
| 3,225,781 | A * | 12/1965 | Kruger | F15B 13/06 137/115.13 |
| 3,606,911 | A * | 9/1971 | Keith | F16K 1/54 137/269 |
| 3,752,188 | A * | 8/1973 | Sage | F16K 3/34 137/625.12 |
| 3,791,413 | A * | 2/1974 | Muller | F16K 47/04 137/625.3 |
| 3,818,921 | A * | 6/1974 | Peczkowski | G05D 16/101 137/501 |
| 3,870,077 | A * | 3/1975 | Nakamura | F16K 47/02 137/614.11 |
| 4,074,693 | A * | 2/1978 | Kates | G05D 7/014 137/454.6 |
| 4,306,585 | A | 12/1981 | Manos | |
| 4,694,852 | A * | 9/1987 | Grant | G05D 7/0126 137/501 |
| 4,795,131 | A * | 1/1989 | Scarano | F16K 31/1223 251/63 |
| 5,174,330 | A * | 12/1992 | Golestan | G05D 7/0133 137/504 |
| 5,383,489 | A * | 1/1995 | Golestan | G05D 7/0133 137/504 |
| 5,488,969 | A * | 2/1996 | King | G05D 7/0635 137/468 |
| 6,082,405 | A * | 7/2000 | Qvarfordh | F16K 47/04 137/625.37 |
| 6,926,249 | B2 * | 8/2005 | Erickson | F16K 1/54 137/625.3 |
| 7,246,635 | B2 * | 7/2007 | Caleffi | F16K 47/023 137/504 |
| 10,036,477 | B2 * | 7/2018 | Gur | F16K 37/0041 |
| 10,203,046 | B2 * | 2/2019 | Handlon | F16K 31/1635 |
| 10,520,099 | B2 * | 12/2019 | Corso | F16K 1/54 |
| 10,605,370 | B2 * | 3/2020 | Hammond | F16K 1/52 |
| 10,830,358 | B2 * | 11/2020 | Hostetter | F16K 47/08 |
| 2002/0017327 | A1 * | 2/2002 | Kawaai | F16K 3/246 137/625.3 |
| 2005/0039797 | A1 * | 2/2005 | Carlson | G05D 16/0655 137/494 |
| 2006/0027771 | A1 * | 2/2006 | Baumann | F16K 1/52 251/119 |
| 2008/0111089 | A1 * | 5/2008 | Hasunuma | F16K 1/54 251/122 |
| 2011/0001077 | A1 * | 1/2011 | Masen | F16K 31/047 251/321 |
| 2012/0074346 | A1 * | 3/2012 | Cook | F16K 1/42 251/366 |
| 2013/0025723 | A1 * | 1/2013 | Dutrop | F16K 47/08 137/625.3 |
| 2017/0184219 | A1 * | 6/2017 | Braeuer | F16K 47/08 |
| 2018/0320791 | A1 * | 11/2018 | Engelbrektsson | F16K 1/42 |

* cited by examiner

PRESSURE COMPENSATED FLOW CONTROLLER WITH ONLY TWO PRESSURES

PRIORITY APPLICATIONS

This application claims priority to U.S. Provisional Application No. 62/534,453, filed on Jul. 19, 2017, and U.S. Provisional Application No. 62/584,201, filed on No. 10, 2017. Both applications are hereby incorporated by reference.

TECHNICAL FIELD

This disclosure is generally directed to valve technologies. More specifically, this disclosure is directed to a pressure compensated flow controller with only two pressures.

BACKGROUND

Most flow regulators in Hydronic HVAC fall into two categories. Category 1 uses a variable restriction which changes size with changing pressure, and (2) Category 2 uses a control restriction with a differential pressure regulator.

The advantage of Category 2 is that the flow can be changed by adjusting the control restriction. That is offset by greater complexity, bulk, and sensitivity compared to Category 1.

For years, many believed that adjusting Category 1 was impractical. The devices in use typically depended on a linear spring and a variable restrictor whose width basically was proportional to the position to the power of −3/2. Offsetting such a device would cause a greater change at low pressures than high, rather than producing good regulation at a new flow.

BRIEF DESCRIPTION OF THE DRAWINGS

For a more complete understanding of this disclosure and its features, reference is now made to the following description, taken in conjunction with the accompanying drawing, in which.

SUMMARY OF THE DISCLOSURE

Figure 1:
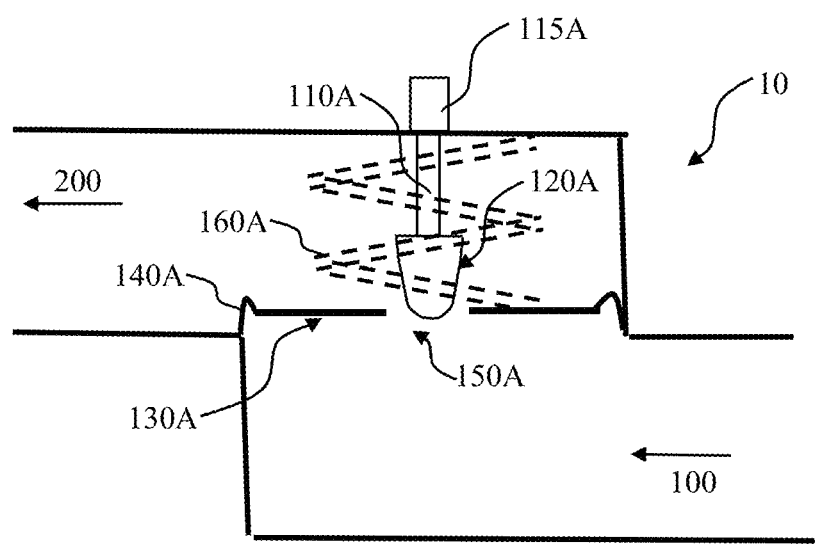
FIG. 1 shows an upstream flow and a downstream flow with a restriction positioned therebetween.

According to an embodiment of the disclosure, an apparatus for controlling a flow of fluid includes a first and a second element that form an exponentially changing restriction between them for a flow of a fluid. At least one of the first and second elements is configured to move in response to changing pressures to change the restriction. One of the first and second elements includes a wall with one or more cutouts that have an admittance that changes exponentially with respect to the movement of the first or second element.

Before undertaking the DETAILED DESCRIPTION below, it may be advantageous to set forth definitions of certain words and phrases used throughout this patent document: the tennis "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The phrase "at least one of," when used with a list of items, means that different combinations of one or more of the listed items may be used, and only one item in the list may be needed. For example, "at least one of: A, B, and C" includes any of the following combinations: A; B; C; A and B; A and C; B and C; and A and B and C. Definitions for certain words and phrases are provided throughout this patent document, those of ordinary skill in the art should understand that in many if not most instances, such definitions apply to prior, as well as future uses of such defined words and phrases.

DETAILED DESCRIPTION

The FIGURE described below, and the various embodiments used to describe the principles of the present disclosure in this patent document are by way of illustration only and should not be construed in any way to limit the scope of the disclosure. Those skilled in the art will understand that the principles of the present disclosure invention may be implemented in any type of suitably arranged device or system. Additionally, the drawings are not necessarily drawn to scale.

It will be understood that well known processes and components have not been described in detail and have been omitted for brevity. Although specific steps, structures and materials may have been described, the present disclosure may not be limited to these specifics, and others may be substituted as it is well understood by those skilled in the art, and various steps may not necessarily be performed in the sequences shown.

Most flow regulators in Hydronic HVAC fall into two categories. Category 1 uses a variable restriction which changes size with changing pressure, and Category 2 uses a control restriction with a differential pressure regulator.

The advantage of Category 2 is that the flow can be changed by adjusting the control restriction. That is offset by greater complexity, bulk, and sensitivity compared to Category 1.

For years, many believed that adjusting Category 1 was impractical. The devices in use typically depended on a linear spring and a variable restrictor whose width basically was proportional to the position to the power of −3/2. Offsetting such a device would cause a greater change at low pressures than high, rather than producing good regulation at a new flow.

As it turns out, though, if a Category 1 is made with an exponentially stiffening spring, the variable restriction is also exponential, meaning that the curves are self-similar when offset. Further, conical springs are already possible with exponentially stiffening. The result, then, is that offsetting the plug changes the flow and produces a similar regulation curve. With turbulent flow, differential pressure changes with the square of the flow. As a result, the force of the spring should be chosen to quadruple over the distance that the open area between the seat and plug halves. If the spring hardens at a slightly faster rate, the flow will increase slightly as the pressure increases, producing positive stability and allowing for some manufacturing error.

Such a variable Category 1 device would allow many of the Category 1 advantages:

1. Due to the entire available differential driving the mechanism, the area being driven can be smaller without accuracy problems
2. Because there is no intermediate area, only one dynamic seal is needed rather than two. Further, this one dynamic seal can easily be a diaphragm. In some embodiments, the need for a seal with zero leakage could be avoided entirely.
3. Because there is only one pressure drop, there is no need for elaborate passages and chambers as in most Category 2 valves.

FIG. 1 shows basic components, according to an embodiment of the disclosure. In particular, FIG. 1 shows a simplified view of a system 10 with two elements that form an exponentially changing restriction between them, one element being moved in response to pressure changes (or more particularly, changes in differential pressure).

Although one element will be shown as being moved in response to pressure, either the pressure-motivated element or its partner can then be moved to set the desired flow rate. This setting could be manual, or due to the motion of an actuator to create a pressure-compensated control valve.

FIG. 1 shows an upstream flow 100 (that may generally correspond to an inlet of a valve) and a downstream flow 200 (that may generally to an outlet of a valve) with a restriction 150A positioned therebetween. As referenced above, this restriction 150A changes exponentially as a result of one element being moved in response to pressure. Although the configurations of FIG. 1 is shown as providing a restriction 150A that is generally positioned transverse to an upstream and downstream flow, in other configurations the restriction can have different configurations—including parallel or at an angled offset to one or more of the upstream and downstream flows.

The first element is a piston 110A/plug 120A. The second element, which is movable in response to pressure changes, is the seat 130A. In the configuration of FIG. 1, pressure against the seat 130A is moved to close the gap with a plug 120A. The plug 120A may generally be considered stationary with respect to the operation; however, an adjustment mechanism 115A may be used to set a level for the gap between the plug 120A and the seat 130A. This adjustment mechanism 115A may be manual or automatic. Additionally, the adjustment mechanism may be connected to a building management system. Although certain configurations may only show adjustment to one element or the other, certain configurations can avail from teaching of this disclosure and have adjustment on both the seat and the plug.

The seat 130A is biased by an exponentially stiffening biasing mechanism 160A. Although shown as a helical compression spring, the exponentially stiffing biasing mechanism 160A may include other biasing features. Additionally, in particular configurations, the biasing mechanism 160A may be viewed as biasing in one or both of closing or opening the restriction 150A.

To allow movement of the seat 130A, a flexible material or membrane 140A may also be used in certain configurations. Although one design is shown, others may also be utilized.

The plug 120A has a shape that interacts with the seat 130A for the exponential changing restrictions. When viewed from a cross-section, the slope of the plug 120A from a tip away from the seat 130A may be viewed as exponential.

Figure 2:
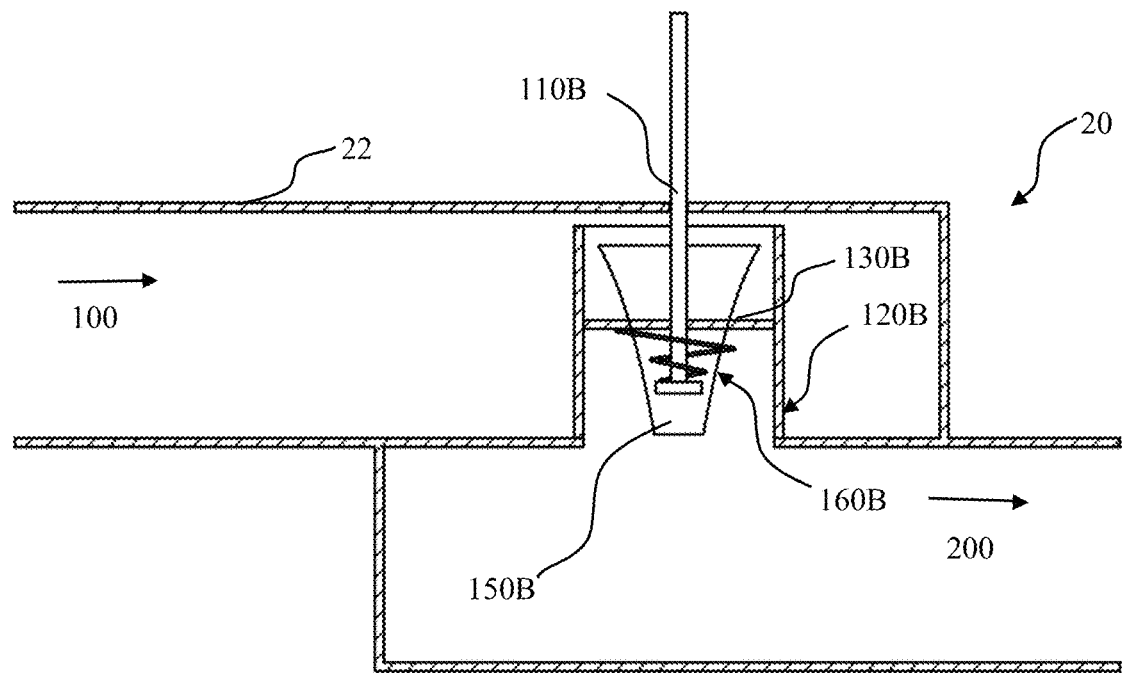
FIG. 2 shows another system, according to an embodiment of the disclosure.

FIG. 2 shows another system 20, according to an embodiment of the disclosure. Although having similar features to FIGS. 1, the system 20 in FIG. 2 utilizes cutouts in a wall one of the elements for restriction of flow between the two elements. In FIG. 2, a piston 110B (that may be adjustable) is generally stationary. An exponential biasing mechanism 160B is shown positioned between an end of the piston 110B and a member 130B. Pressure is exerted upon member 130B to resist the exponential biasing mechanism 160B and either increase or decrease an area of cutout that forms a port 150B. With reference to FIG. 2, fluid from the upstream flow 100 would be coming out of the page through port 150B towards a viewer before heading to towards the downstream flow 200. When more pressure occurs on the top side of the member 130B, the member 130B would be pushed down and less flow would come out of the port 150B (e.g., due to less are in the port).

The cutout shape of the port 150B is shown as an exponential. Although a particular shape is shown for the port 150B, other shapes may be used in other configurations.

Additionally, although the exponential biasing mechanism 160B is shown inside a conduit 22, the exponential biasing mechanism 160B may be placed at other locations. For example, the exponential biasing mechanism 160B may be placed outside the conduit 22.

Figure 3:
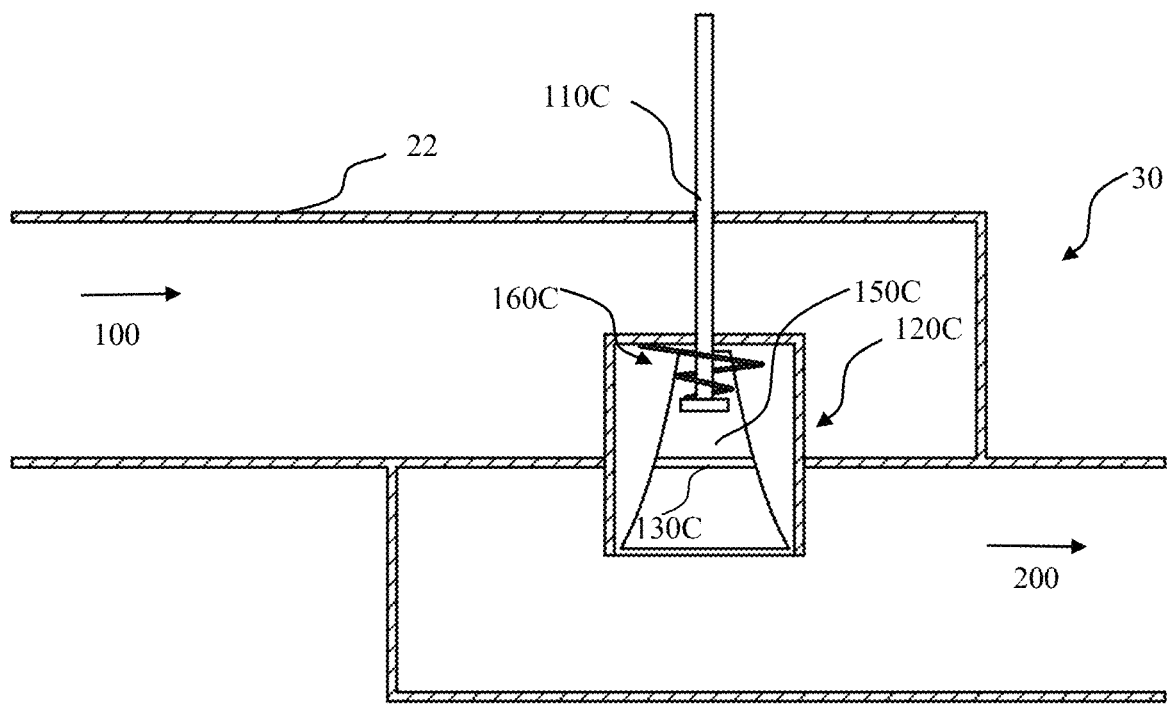
FIG. 3 shows another system, according to an embodiment of the disclosure.

FIG. 3 shows another system 30, according to an embodiment of the disclosure. The system of FIG. 3 has similar features to FIGS. 2, including a port 150C from which fluid would exit out from the page, a cup shaped member 120C that receives pressure and moves down, a generally stationary (but adjustable) rod 110C, and an exponential biasing member 160C. Because the cut-out 150C is part of the moving cup shaped member 120C and is restricted by the fixed surface 130C, the port is reversed compared to FIG. 2. In both cases, the portion of port 150A or 150C through water is allowed to flow becomes exponentially smaller as pressure changes the relative position between 120C and 130C.

The cutout shape of the port 150C is shown as an exponential. Although a particular shape is shown for the port 150C, other shapes may be used in other configurations.

Additionally, although the exponential biasing mechanism 160C is shown inside a conduit 22, the exponential biasing mechanism 160C may be placed at other locations. For example, the exponential biasing mechanism 160C may be placed outside the conduit.

Figure 4:
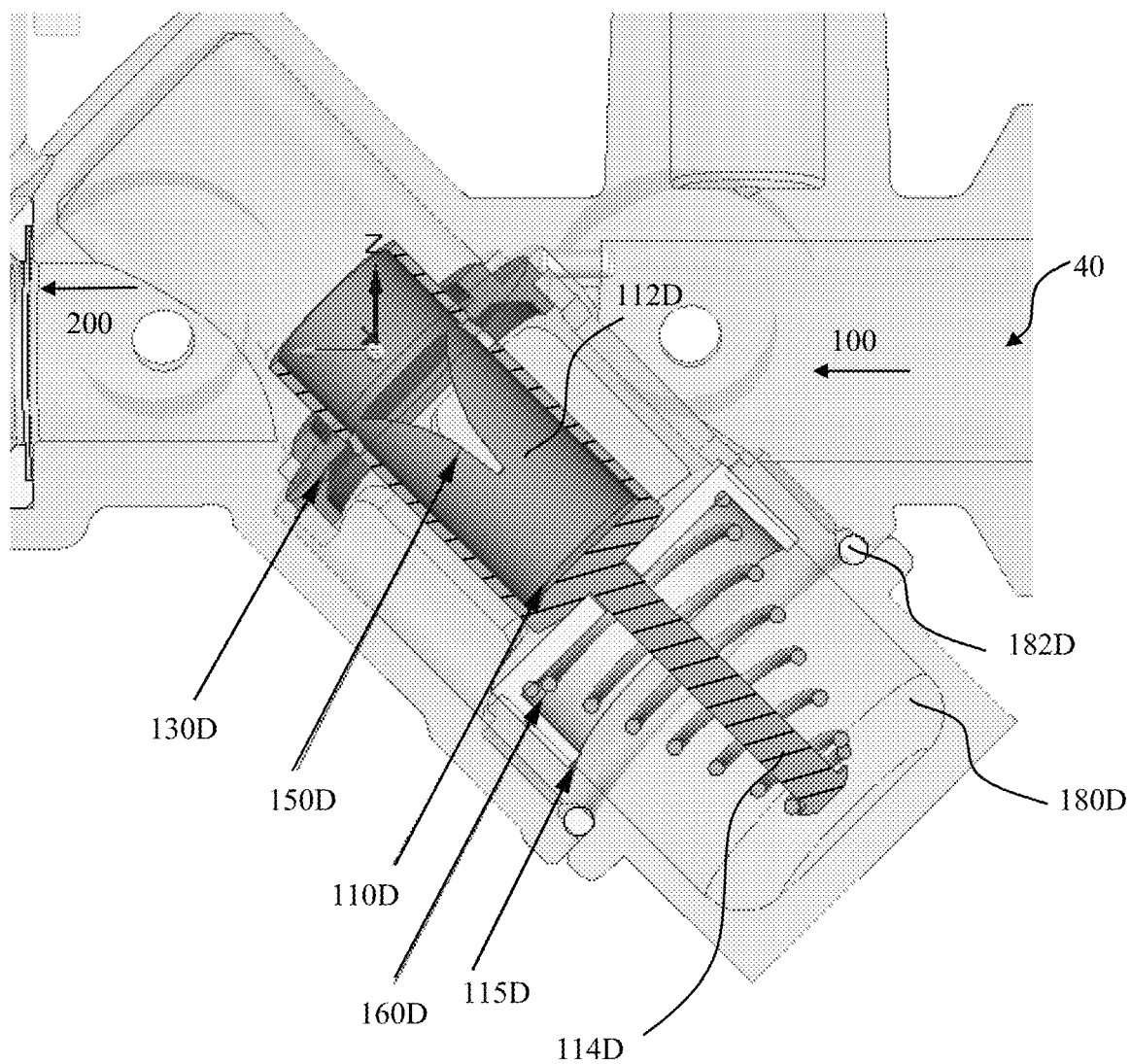
FIG. 4 shows another system, according to an embodiment of the disclosure.

FIG. 4 shows another system 40, according to an embodiment of the disclosure. Although having similar features to FIGS. 1, 2, and 3, the system 40 in FIG. 4 positions elements at an angle with respect to the upstream flow 100 and the downstream flow 200. Additionally, the flow between the two elements utilizes cutouts in a wall one of the elements.

In FIG. 4, the first element is a shear ring 130D. The second element, which is movable in response to pressure changes, is a piston 110D. The piston 110D has a wall 112D with four cutouts that form ports 150D (only one and two additional partial cutouts seen from the view of FIG. 3). The shear ring 130D interacts with the ports 150D in the piston 110D to allow flow therebetween.

The cutout shape of the ports 150D are shown as an exponentially changing area. Although a particular shape is shown for the ports 150D, others may be used in other configurations.

The piston 110D also has a rod portion 114D that extends through an adjustable plate 115D. The exponentially stiffening biasing mechanism 160D, which is shown as a spring biases the adjustable plate 115D and the piston 160D.

The combination of the exponentially stiffening biasing mechanism 160D and the ports 150D interacting with the sheer ring 130D allow the exponentially changing admittance of fluid from the upstream flow 100 to the downstream flow 200.

The bottom portion of the system 40 includes a housing 180D that may be removable. In certain configurations, the removal of the housing 180D may allow access to and/or replacement of the piston 110D, adjustment plate 115D, and/or sheer ring 130D. In one configuration, the adjustment to the adjustment plate 115D may simply be use of different sizes. The housing may be sealed using, for example, seals 182D.

One of ordinary skill in the art will recognize that the disclosure provided herein may apply to pressure compensated control valves, adjustable flow controller, and other configurations. Although certain configurations have been provided, there are many geometries that can potentially be used.

As a recapitulation of certain features in these contexts, as to an adjustable flow controller, disk and sleeve embodiment, an exponentially hardening spring is opposed across a disk to the differential pressure across the device. Around the disk is a sleeve with an exponential cutout. One end of the spring presses against the disk, the other can be positioned relative to the sleeve to select different flow rates. An example of an adjusting mechanism to change the position of the spring would be rod with a screw thread at one end.

As to a control valve, disk and sleeve embodiment, just like the adjustable flow controller, a disk could be positioned against a sleeve, the disk being free to move in response to pressure. In the case of a control valve, the end of the spring opposite the disk would also be moved by an external actuator in response to a control signal.

Most pressure compensated control valves have a pressure regulator and a control restriction. These are two separate restrictions in series, creating between them a region of pressure less than the upstream pressure, but greater than the downstream pressure.

In certain configurations, the idea is to operate only with upstream pressure and downstream pressure. A single variable restriction is moved both according to a control input and according to the differential pressure across it. It is possible that the control input would move one element and the pressure acting against the spring would move the other, or the control input could change the location of the biasing member opposite of the pressure activated member.

When pressure changes for instance from 2 to 4 psi, the opening required for a given flow rate changes by a certain percentage. That percentage does not depend on what flow it is. Thus, offsetting an equal percentage plug by a distance based on differential pressure should produce flow regulation. To achieve this, a restriction which changes exponentially should be paired with an element that moves logarithmically with pressure. Fortunately, logarithmic motion in response to pressure corresponds to an exponentially hardening spring combined with a constant active area. A conical spring can be made with such a characteristic.

For turbulent flow, pressure changes quadratically with flow rate. Thus, changing the size of the opening by a factor of four corresponds to changing the pressure by a factor of 16. A very well designed and built control valve can have a controlled change in opening suitable to change the flow by a factor of 100 at constant pressure. In such a case, regulation could work well potentially over a factor of 25 in target flow and simultaneously over a factor of 16 in differential pressure, all with a single opening.

Such configurations may provide a number of advantages. The most common way to make a pressure compensated control valve is to have a pressure regulator and a control valve. The pressure regulator is normally moved by the pressure drop across the control valve, which is meant to be constant and not very high. This means that the regulating restriction mechanism must move with as little pressure as possible. This leads to large driving areas and close tolerances. The current device, on the other hand, would drive the regulating mechanism with the full differential pressure across the device. Thus at 32 psi, the mechanism would have 32 psi to move it, for example, rather than 3 or 4 psi.

Another advantage is that there is no intermediate pressure. This eliminates the need for one seal. The seal eliminated is, in most designs, required to handle large pressure drops with little friction.

A further advantage of some embodiments is that there is no need for passages to communicate pressure from one place to another.

An additional advantage of this technique may be the ability to create flow limiters with higher flow rates for a given piston diameter. With a linear spring, as mentioned before, a class 1 regulator has an opening width proportional to the displacement to the −3/2 power. This results in a port which is very wide at low pressures and very narrow at high pressures. Using a spring with an exponentially hardening characteristic, the width of the opening varies much less dramatically for a given range of pressures to maintain a constant flow.

Figure 5:
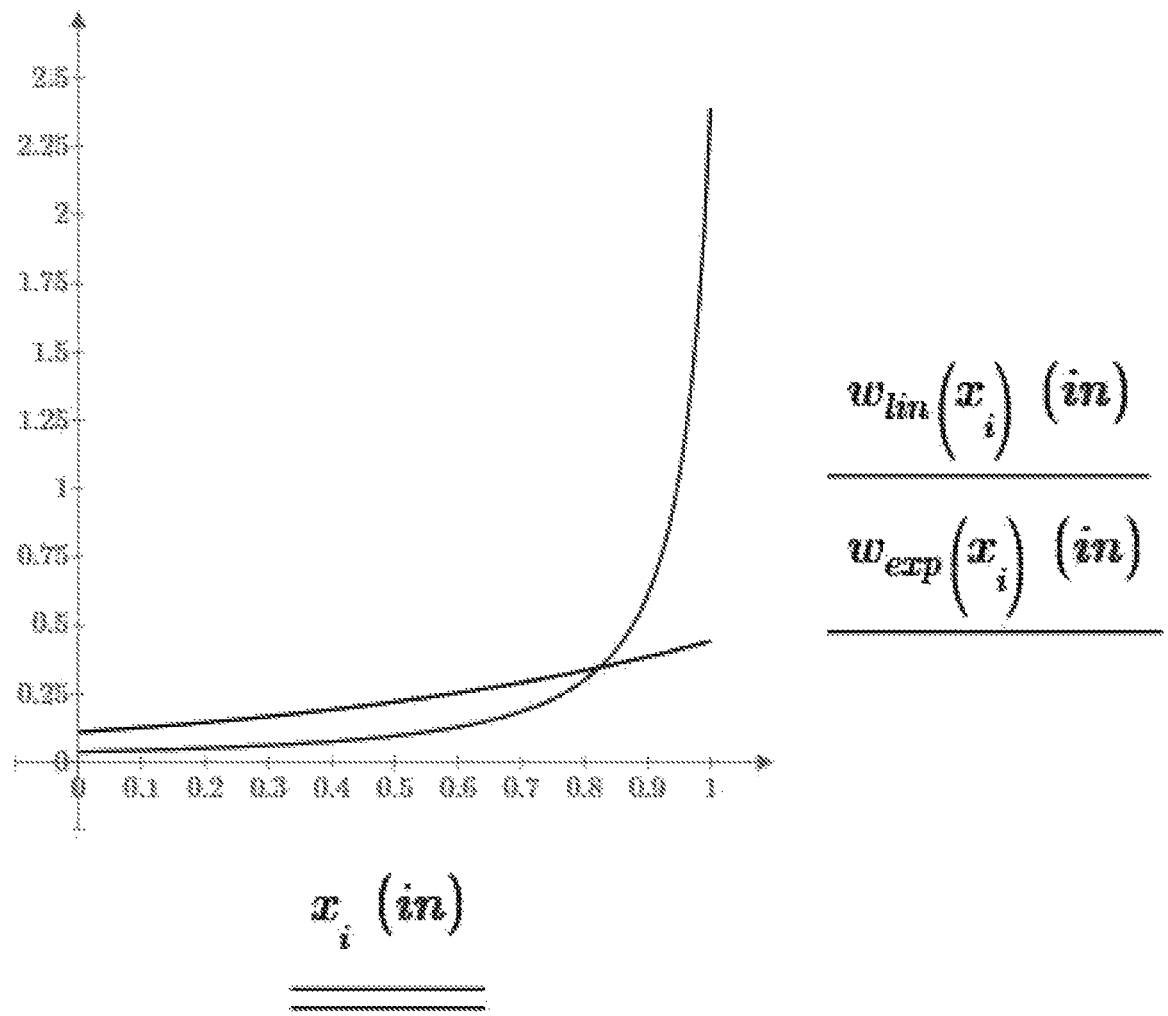
FIG. 5 provides a comparison of port width as a function of x between an exponential spring and a linear spring.

FIG. 5 provides a comparison of port width as a function of x between an exponential spring and a linear spring. Key equations related to the graph in FIG. 5 include the following:

$$\frac{dA}{dP} = \frac{\sqrt{\rho} \cdot P^{-1.5}}{C_d \cdot \sqrt{2}}$$

$$\frac{dA}{dx} = \frac{dA}{dP} \cdot \frac{dP}{dx}$$

$$dP_{lin}dx := \frac{(P_{min} - P_{max})}{\text{Travel}}$$

$$P_{exp}(x) := P_{max} \cdot e^{\frac{-x}{\text{Travel}} \cdot \ln\left(\frac{P_{max}}{P_{min}}\right)}$$

$$dP_{exp}dx(x) := \frac{-\ln\left(\frac{P_{max}}{P_{min}}\right)}{\text{Travel}} \cdot P_{exp}(x)$$

In the above equations, all pressures are actually differential pressures.

A: Area of opening
Pmin: minimum differential pressure for regulation
Pmax: maximum differential pressure for regulation
Travel: distance that the moveable element travels between Pmin and Pmax
Plin: pressure as a function of x for the linear spring
Pexp: pressure as a function of x for the exponential spring
X: Position of the moveable element away from its maximum restriction.

Interpretation

As can be seen in the graph, the width of the port with the exponential spring varies dramatically less than with a linear spring. This means that a smaller piston diameter can be used, and the tool that cuts the port can be larger. Both of these factors improve the economics of flow limiters.

To summarize certain of the features, as compared to P1-P2-P3 devices, configurations disclosed herein may have one, more than, or all of the following: (1) more compact, (2) one seal fewer, (3) less sensitive to friction, and (4) no internal passages. Additionally, a progressive rate may enable more flow at a given starting pressure for non-adjustable flow limiters.

While this disclosure has described certain embodiments and generally associated methods, alterations and permutations of these embodiments and methods will be apparent to those skilled in the art. As a non-limiting example, although spring are described in certain configurations, other configurations may utilize other biasing mechanisms with the desired characteristics (e.g., but not limited to an exponentially hardening characteristic) according to other embodiments. Accordingly, the above description of example embodiments does not define or constrain this disclosure. Other changes, substitutions, and alterations are also possible without departing from the spirit and scope of this disclosure, as defined by the following claims.

What is claimed is:

1. A valve comprising:
   a spring;
   a shear ring;
   a piston configured to move under a differential pressure across the valve, the motion of the piston driven by the differential pressure and opposed by the spring such that the differential pressure across the valve increases exponentially with a change in a position of the piston; and
   an opening formed between the piston and the shear ring, the opening decreasing exponentially with the position of the piston at half an exponential rate of the pressure, thereby providing a constant flow rate for fluids with turbulent flow.

2. The valve of claim 1, wherein the spring can be offset to alter a flow rate setting in the valve.

3. The valve of claim 1, wherein a force of the spring quadruples over a distance that the opening halves.

4. The valve of claim 1, wherein the spring is an exponentially stiffened spring.

5. The valve of claim 1, wherein one of the piston or the shear ring includes a wall with one or more cutouts that forms the opening.

6. The valve of claim 5, wherein the wall is a wall of a tube hollow cylinder and the one or more cutouts have a shape that is exponential.

7. The valve of claim 1, wherein the exponentially changing opening operates with just an upstream pressure and a downstream pressure corresponding to the flow of the fluid.

8. The valve of claim 1, further comprising a removable chamber, wherein one of the piston or shear ring are positioned within the removable chamber.

* * * * *